United States Patent [19]

Nakamura et al.

[11] Patent Number: 5,107,504
[45] Date of Patent: Apr. 21, 1992

[54] MULTILEVEL QUADRATURE AMPLITUDE MODULATOR CAPABLE OF REDUCING A MAXIMUM AMPLITUDE OF A MULTILEVEL QUADRATURE AMPLITUDE MODULATED SIGNAL REGARDLESS OF TRANSMISSION DATA INFORMATION OR REDUNDANT INFORMATION

[75] Inventors: Katsuhiro Nakamura; Seiichi Noda, both of Tokyo, Japan

[73] Assignee: NEC Corporation, Japan

[21] Appl. No.: 374,274

[22] Filed: Jun. 30, 1989

[30] Foreign Application Priority Data

Jun. 30, 1988 [JP] Japan .................. 63-164338

[51] Int. Cl.$^5$ .................................. G06F 11/00
[52] U.S. Cl. .................... 371/37.1; 371/2.1; 371/30; 375/17; 375/39
[58] Field of Search ............ 371/37.1, 30, 2.1; 375/17, 39

[56] References Cited

U.S. PATENT DOCUMENTS

| | | | |
|---|---|---|---|
| 4,311,964 | 1/1982 | Boykin | 375/83 |
| 4,553,237 | 11/1985 | Nakamura | 371/37.1 |
| 4,716,385 | 12/1987 | Noda et al. | 375/39 |
| 4,751,478 | 6/1988 | Yoshida | 375/39 |
| 4,811,021 | 3/1989 | Yoshimoto et al. | 455/63 |
| 4,859,956 | 8/1989 | Mizoguchi | 375/39 |

Primary Examiner—Jerry Smith
Assistant Examiner—Ly V. Hua
Attorney, Agent, or Firm—Laff, Whitesel, Conte & Saret

[57] ABSTRACT

In order to produce first and second Lee-error correcting code sequences in a multilevel quadrature amplitude modulator comprising a code converting unit (10) for converting first and second $2^m$-level input digital signals into first and second major converted signals by rearranging a square signal point arrangement into an approximately circular arrangement on a phase plane, each of the first and the second major converted signals consisting of m binary bits numbered from a first (least significant) bit through an m-th (most significant) bit, a first error correcting code producing circuit (21) carries out error correcting calculation for the first through an n-th bits of the first major converted signal to produce the first Lee-error correcting code sequence where n represents an integer which is not less than two and is not less than m. Similarly, a second error correcting code producing circuit (22) produces the second Lee-error correcting code sequence. The first and the second major converted signals are multiplexed with the first and the second error correcting code sequences into first and second major multiplexed signals, respectively. The first and the second major multiplexed signals are modulated into a multilevel quadrature amplitude modulated signal. In a counterpart multilevel quadrature amplitude demodulator, an inverse operation is carried out to produce the first and the second input digital signals.

8 Claims, 5 Drawing Sheets

| SIGNAL 192 | SIGNAL 201 | SIGNAL 211 OF +1 | | SIGNAL 211 OF −1 | |
|---|---|---|---|---|---|
| | | SIGNAL 221 | SIGNAL 231 | SIGNAL 221 | SIGNAL 231 |
| 12 | 1 | — | — | 11 | 0 |
| 11 | 0 | 12 | 1 | 10 | 0 |
| 10 | 0 | 11 | 0 | 9 | 0 |
| 9 | 0 | 10 | 0 | 8 | 0 |
| 8 | 0 | 9 | 0 | 7 | 0 |
| 7 | 0 | 8 | 0 | 6 | 0 |
| 6 | 0 | 7 | 0 | 5 | 0 |
| 5 | 0 | 6 | 0 | 4 | 0 |
| 4 | 0 | 5 | 0 | 3 | 0 |
| 3 | 0 | 4 | 0 | 2 | 0 |
| 2 | 0 | 3 | 0 | 1 | 0 |
| 1 | 0 | 2 | 0 | 0 | 0 |
| 0 | 0 | 1 | 0 | 15 | 0 |
| 15 | 0 | 0 | 0 | 14 | 0 |
| 14 | 0 | 15 | 0 | 13 | 0 |
| 13 | 0 | 14 | 0 | 12 | 0 |
| 12 | 0 | 13 | 0 | 11 | 1 |
| 11 | 1 | 12 | 0 | — | — |

FIG. 5

| SIGNAL 192 | SIGNAL 201 | SIGNAL 211 OF +2 ||SIGNAL 211 OF -2 ||
|---|---|---|---|---|---|
| | | SIGNAL 221 | SIGNAL 231 | SIGNAL 221 | SIGNAL 231 |
| 12 | 1 | — | — | 10 | 0 |
| 11 | 0 | — | — | 9 | 0 |
| 10 | 0 | 12 | 1 | 8 | 0 |
| 9 | 0 | 11 | 0 | 7 | 0 |
| 8 | 0 | 10 | 0 | 6 | 0 |
| 7 | 0 | 9 | 0 | 5 | 0 |
| 6 | 0 | 8 | 0 | 4 | 0 |
| 5 | 0 | 7 | 0 | 3 | 0 |
| 4 | 0 | 6 | 0 | 2 | 0 |
| 3 | 0 | 5 | 0 | 1 | 0 |
| 2 | 0 | 4 | 0 | 0 | 0 |
| 1 | 0 | 3 | 0 | 15 | 0 |
| 0 | 0 | 2 | 0 | 14 | 0 |
| 15 | 0 | 1 | 0 | 13 | 0 |
| 14 | 0 | 0 | 0 | 12 | 0 |
| 13 | 0 | 15 | 0 | 11 | 1 |
| 12 | 0 | 14 | 0 | — | — |
| 11 | 1 | 13 | 0 | — | — |

FIG. 6

MULTILEVEL QUADRATURE AMPLITUDE MODULATOR CAPABLE OF REDUCING A MAXIMUM AMPLITUDE OF A MULTILEVEL QUADRATURE AMPLITUDE MODULATED SIGNAL REGARDLESS OF TRANSMISSION DATA INFORMATION OR REDUNDANT INFORMATION

BACKGROUND OF THE INVENTION

This invention relates to a multilevel quadrature amplitude modulator which has an error correcting code producing unit and to a multilevel quadrature amplitude demodulator for use as a counterpart of the modulator. Such a modulator and a demodulator are particularly useful in a radio transmission system.

In the radio transmission system, the multilevel quadrature amplitude modulator uses a radio frequency band as known in the art. In the multilevel quadrature amplitude modulator, a pair of quadrature-phase carrier signals are amplitude modulated by first and second input digital signals into a multilevel quadrature amplitude modulated signal. When each of the first and the second input digital signals is an m-bit binary signal, where m is a predetermined number which is not less than three, each of the first and the second input digital signals is capable of representing at most N levels where N is equal to $2^m$. In this event, the multilevel quadrature amplitude modulated signal has $2^{2m}$ output signal points on a phase plane which has an origin and real and imaginary axes orthogonally crossing at the origin. The output signal points are arranged uniformly in a lattice structure on a square region which has a center point at the origin and four sides parallel to the real and the imaginary axes. Such an arrangement of the output signal points is called a square arrangement. The number of the output signal points is as many as $2^{2m}$, such as sixty-four or two-hundred and fifty-six.

A certain transmission power is required for transmitting the multilevel quadrature amplitude modulated signal by a transmitter. The transmission power is dependent on a peak amplitude of the multilevel quadrature amplitude modulated signal, namely a distance between the origin and the output signal points placed at each vertex of the square region. The peak amplitude increases in proportion to an increase in the number of the output signal points. It is desirable to reduce the transmission power. In order to reduce the peak amplitude, the square arrangement is modified into an approximately circular arrangement according to signal conversion disclosed in U.S. Pat. No. 4,716,385 issued to Seiichi Noda, namely, one of the two instant applicants, et al and assigned to the instant assignee. A multilevel quadrature amplitude modulator of Noda et al patent comprises a signal conversion circuit for converting the square arrangement into the approximately circular arrangement defined by a specific region inwardly of an approximate circle. As a result of the signal conversion, a plurality of output signal points are shifted from areas of four corners of the square region so that shifted output signal points are inwardly of the specific region. When each of the first and the second input digital signals is the m-bit binary signal, the signal conversion circuit produces first and second converted signals each of which consists of parallel m bits. The first and the second converted signals are modulated into the multilevel quadrature amplitude modulated signal for carrying the first and the second converted signals as transmission data information. On carrying the transmission data information, the multilevel quadrature amplitude modulated signal has a decreased peak amplitude which is equal to a radius of the specific region and which is shorter than a half of a diagonal of the square region.

In the meanwhile, the multilevel quadrature amplitude modulated signal is inevitably subjected to a transmission error, namely, a code error, of the transmission data information. In order to reduce the code error, the multilevel quadrature amplitude modulator of Noda et al patent further comprises first and second error correcting code producing circuits each of which makes use of an error correcting code. As the error correcting code, a Lee-error correcting code is exemplified in a report contributed by Katsuhiro Nakamura, namely, by the other of the instant applicants, to ICC Conference Record, Vol. 4-3 (June 1979), pages 45.4.1 to 45.4.5, under the title of "A Class of Error Correcting Codes for DPSK Channels". The first error correcting code producing circuit is for the first converted signal consisting of parallel m bits while the second error correcting code producing circuit is for the second converted signal consisting of parallel m bits. Each of the first and the second error correcting code producing circuits carries out error correcting calculation for parallel m bits and produces first and second error correcting code sequences each of which consists of parallel m bits. In this event, it will be understood that the first and the second error correcting code producing circuits carry out the error correcting calculation for the output signal points of the square arrangement. The first and the second error correcting code sequences are multiplexed into the first and the second converted signals, respectively, in the form of redundant information. It should be understood that the multilevel quadrature amplitude modulated signal has the peak amplitude which is equal to a half of a diagonal of the square region on carrying the redundant information.

SUMMARY OF THE INVENTION

It is therefore an object of this invention to provide a multilevel quadrature amplitude modulator which is capable of producing a multilevel quadrature amplitude modulated signal with a decreased peak amplitude regardless of transmission data information or redundant information.

It is another object of this invention to provide a multilevel quadrature amplitude demodulator for use as a counterpart of the modulator of the type described above.

A multilevel quadrature amplitude modulator to which this invention is applicable is for modulating first and second input digital signals into a multilevel quadrature amplitude modulated signal. Each of the first and the second input digital signals is capable of representing at most N levels where N is equal to $2^m$ where, in turn, m represents an integer which is not less than three. The multilevel quadrature amplitude modulated signal is specified by a plurality of signal points on a phase plane. The modulator rearranges the signal points on the phase plane from a square arrangement into an approximately circular arrangement in which the signal points are arranged on an approximately circular region having a specific region inwardly of a circle.

According to this invention, the modulator comprises code converting means for converting the first input digital signal to first major and first minor converted signals and the second input digital signal to second major and second minor converted signals. Each of the first and the second major converted signals has m bits numbered from a first bit to an m-th bit in bit parallel and has a first rearranged group of a first predetermined number of levels and a second rearranged group of a second predetermined number of levels. The first bit is a least significant bit of each of the first and the second major converted signals. Each of the first and the second predetermined number of levels is related to one of the signal points at a time. The first minor converted signal has a third predetermined number of levels related to the first and the second rearranged groups. The second minor converted signal has a fourth predetermined number of levels related to the first and the second rearranged groups. The modulator further comprises first error correcting code producing means for producing a first Lee-error correcting code sequence in response to a first error correcting input signal consisting of the first through an n-th bits of the first major converted signal where n represents an integer which is not less than two and is not less than m, second error correcting code producing means for producing a second Lee-error correcting code sequence in response to a second error correcting input signal consisting of the first through the n-th bits of the second major converted signal, first multiplexing means for multiplexing the first Lee-error correcting code sequence and the first major converted signal into a first major multiplexed signal and a signal of zero value and the first minor converted signal into a first minor multiplexed signal, second multiplexing means for multiplexing the second Lee-error correcting code sequence and the second major converted signal into a second major multiplexed signal and a signal of zero value and the second minor converted signal into a second minor multiplexed signal, and modulating means for modulating the first major and the first minor multiplexed signals and the second major and the second minor multiplexed signals into the multilevel quadrature amplitude modulated signal.

A multilevel quadrature amplitude demodulator to which this invention is applicable, is for use as a counterpart of a modulator for converting a first input digital signal and a first Lee-error correcting code sequence into a first modulating signal and converting a second input digital signal and a second Lee-error correcting code sequence into a second modulating signal and for modulating the first and the second modulating signals into a multilevel quadrature amplitude modulated signal specified by a plurality of signal points on a phase plane. Each of the first and the second input digital signals being capable of representing at most N levels where N is equal to $2^m$ where, in turn, m represents an integer which is not less than three. The modulator rearranges the signal points on the phase plane from a square arrangement into an approximately circular arrangement in which the signal points are arranged on an approximately circular region having a specific region inwardly of a circle. The demodulator is for demodulating the multilevel quadrature amplitude modulated signal into a first and a second output digital signal.

According to this invention, the demodulator comprises demodulating means for amplitude demodulating the multilevel quadrature amplitude modulated signal into first major and first minor demodulated signals and second major and second minor demodulated signals. Each of the first and the second major demodulated signals has m bits numbered from a first bit to an m-th bit in bit parallel and has a first rearranged group of a first predetermined number of levels and a second rearranged group of a second predetermined number of levels. The first bit is a least significant bit of each of the first and the second major demodulated signals. Each of the first and the second predetermined number of levels is related to one of the signal points at a time. The first minor demodulated signal has a third predetermined number of levels related to the first and the second rearranged groups. The second minor demodulated signal has a fourth predetermined number of levels related to the first and the second rearranged groups. The demodulator further comprises first error correcting calculation means for producing a first error correcting signal in response to a first error correcting input signal consisting of the first through an n-th bits of the first major demodulated signal where n represents an integer which is not less than two and is not less than m. The demodulator still further comprises second error correcting calculation means for producing a second error correcting signal in response to a second error correcting input signal consisting of the first through the n-th bits of the second major demodulated signal, first error correcting means for correcting the first major and the first minor demodulated signals with reference to the first error correcting signal to produce a first major correcting result signal as a reproduction of the first modulating signal and a first minor correcting result signal, respectively, second error correcting means for correcting the second major and the second minor demodulated signals with reference to the second error correcting signal to produce a second major correcting result signal as a reproduction of the second modulating signal and a second minor correcting result signal, respectively, and code converting means for converting the first major and the first minor correcting result signals and the second major and the second minor correcting result signals into the first and the second output digital signals as reproductions of the first and the second input digital signals.

DESCRIPTION OF THE PREFERRED EMBODIMENT

Figure 1:
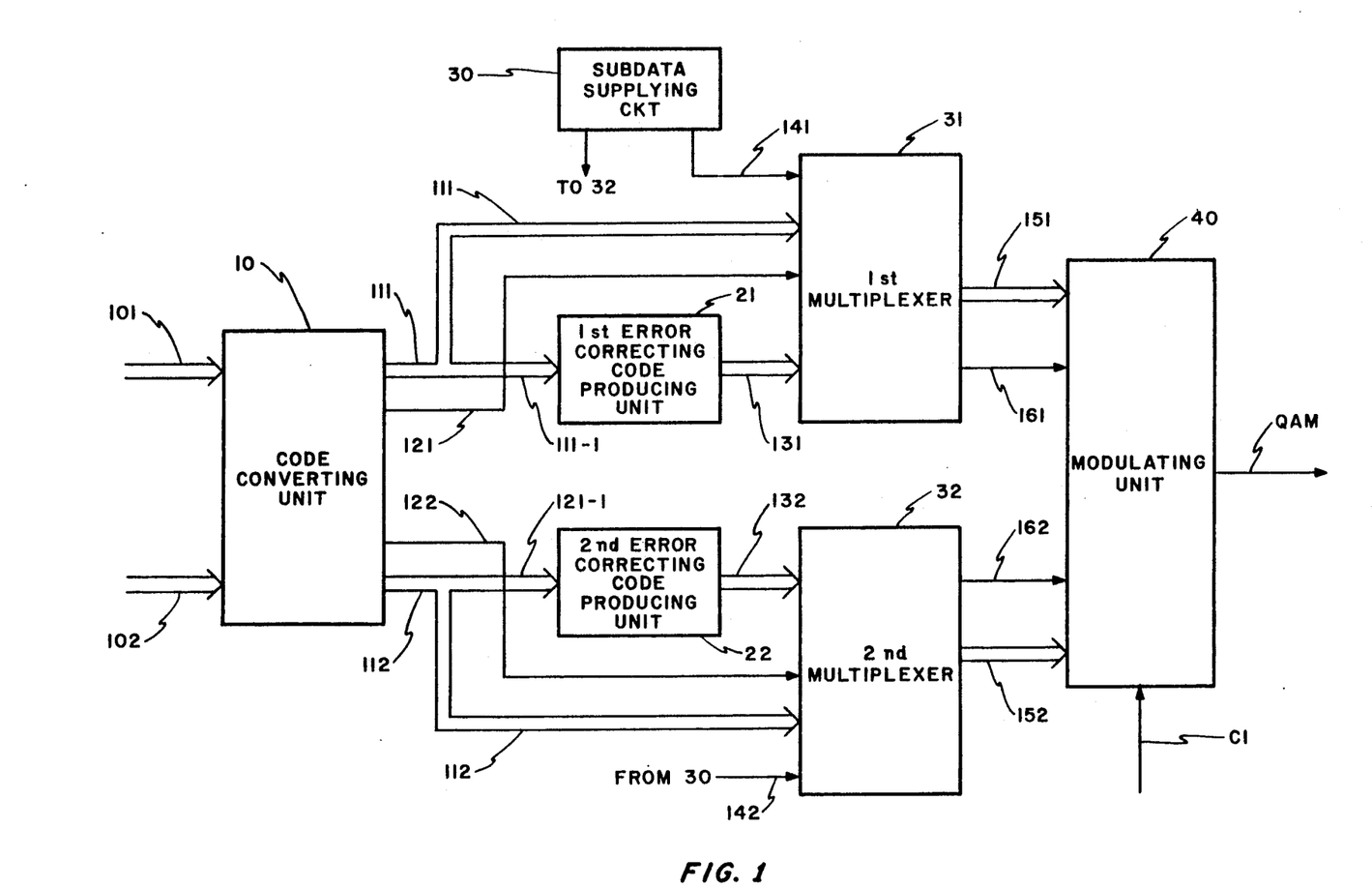
FIG. 1 is a block diagram of a multilevel quadrature amplitude modulator according to a first embodiment of this invention.

Referring to FIG. 1, a multilevel quadrature amplitude modulator according to this invention is for use in modulating a first input digital signal 101 of a channel P and a second input digital signal 102 of another channel Q into a multilevel quadrature amplitude modulated signal QAM. It will be assumed merely by way of example that each of the first and the second input digital signals is capable of representing at most N levels where N is equal to $2^m$ where, in turn, m represents an integer which is not less than three. In the example being illustrate, each of the first and the second input digital signals 101 and 102 is a four bit binary signal and is therefore capable of representing sixteen levels. A combination of the first and the second input digital signals 101 and 102 can represent signal values of two hundred and fifty-six. The signal values of two hundred and fifty-six are produced as the multilevel quadrature amplitude modulated signal QAM as described later.

Figure 2:
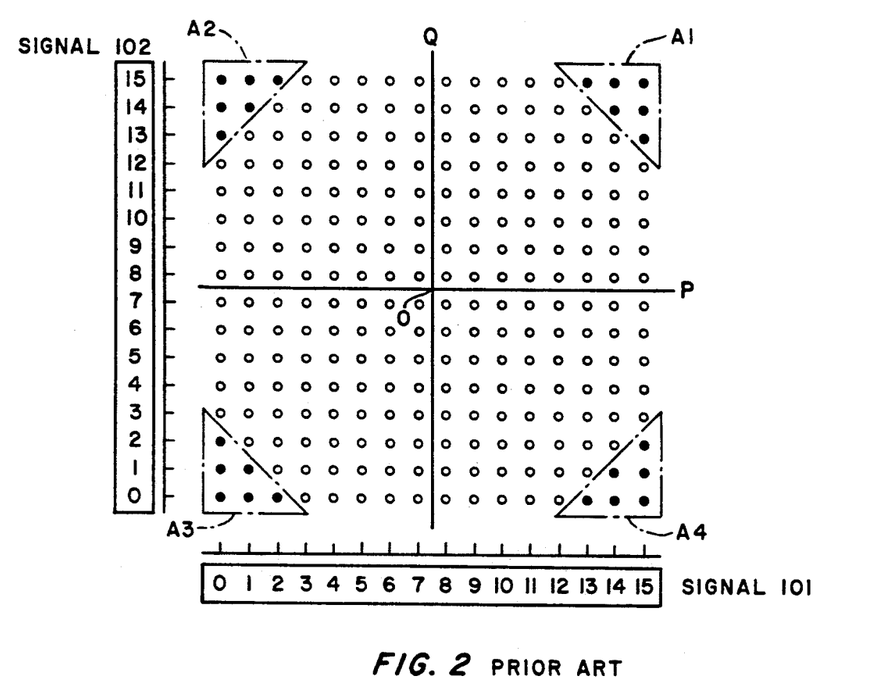
FIG. 2 shows an output signal point arrangement of a conventional multilevel quadrature amplitude modulated signal.

Turning to FIG. 2 for a short while, the signal values of two hundred and fifty-six are depicted as output signal points (shown by white circles) of two hundred and fifty-six on a phase plane. The phase plane is defined by an origin 0 and orthogonal coordinate axes which are usually referred to as real and imaginary axes P and Q crossing at the origin 0. When distributed on the phase plane in a usual manner, the output signal points of two hundred and fifty-six form a square on the phase plane. A distance between two adjacent output signal points is given by a unit distance. A peak amplitude is represented by a distance between the origin 0 and output signal points placed at each vertex of the square. Such an arrangement will be called a square arrangement. Zeroth through fifteenth levels 0 to 15 of the first input digital signal 101 are illustrated along a side of the square. Similarly, zeroth through fifteenth levels 0 to 15 of the second input digital signal 102 are illustrated along another side of the square. Each of the zeroth through the fifteenth levels is related to one of the output signal points at a time.

Turning back to FIG. 1, the modulator comprises a code converting unit 10 supplied with the first and the second input digital signals 101 and 102. The code converting unit 10 converts the first input digital signal 101 to first major and first minor converted signals 111 and 121 and converts the second input digital signal 102 to second major and second minor converted signals 112 and 122. Each of the first and the second major converted signals 111 and 121 has four bits numbered from a first bit (a least significant bit) to a fourth bit (a more significant bit) in bit parallel and is capable of representing at most sixteen levels. Each of the first and the second minor converted signals 112 and 122 is a binary signal and is capable of representing two levels.

The code converting unit 10 is supplied with two hundred and fifty-six signal values. The code converting unit 10 is for rearranging two hundred and fifty-six output signal points of the square arrangement illustrated in FIG. 2 into an approximately circular arrangement on the phase plane by carrying out code conversion as will later be described. In order to derive the approximately circular arrangement, twenty-four output signal points (shown by black circles) in first through fourth corners A1 to A4 (FIG. 2) of the square are shifted along four sides of the square as shifted output signal points.

Figure 3:
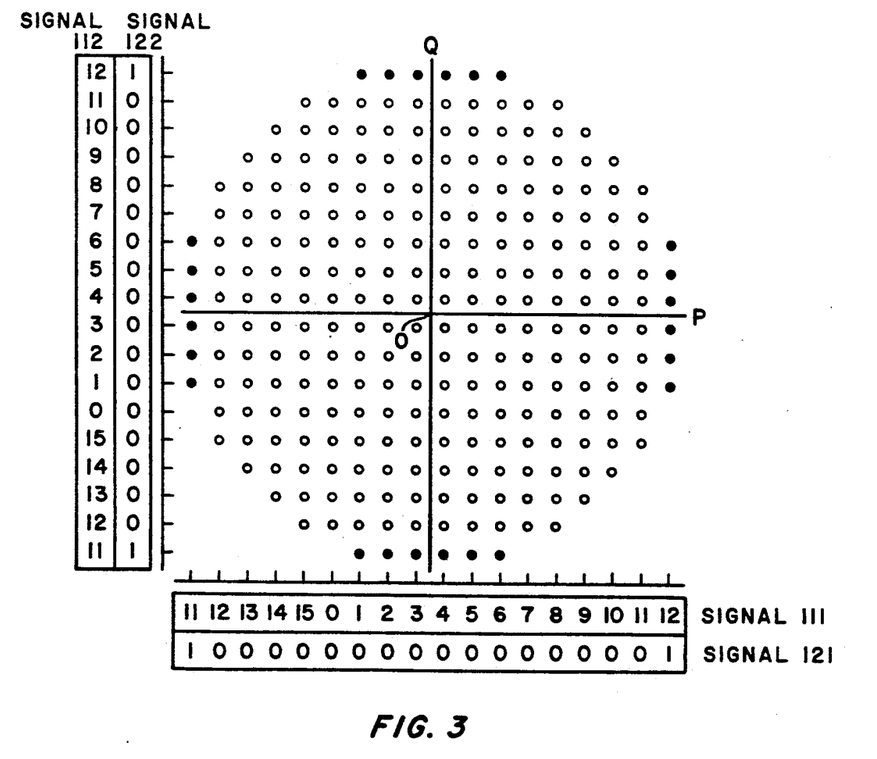
FIG. 3 shows an output signal point arrangement of a quadrature amplitude modulated signal produced by the multilevel quadrature amplitude modulator illustrated in FIG. 1.

Referring to FIG. 3 together with FIG. 1, the first input digital signal 101 is rearranged in the first major converted signal 111 by the code converting unit 10 into first and second rearranged groups. The first rearranged group consists of zeroth through fifteenth levels 0 to 15, each depicted as a first member of a set of two numbers, such as "12, 0", ..., "15, 0", "0, 0", "1, 0", ..., and "11, 0" except for a top set of "12, 1" and a bottom set of "11, 1". Namely, the code converting unit 10 converts the zeroth through the third levels 0 to 3 and the fourth through the fifteenth levels 4 to 15 of the first input digital signal 101 into the first major converted signal 111 of the twelfth through the fifteenth levels 12 to 15 and the zeroth through the eleventh levels 0 to 11, respectively. Such a conversion can be realized by subtracting four modulo 16 from each of the zeroth through the fifteenth levels 0 to 15 of the first input digital signal 101. Comparison of FIGS. 2 and 3 will show that the zeroth through the seventh levels 0 to 7 are shifted from a lower region of sixteen levels (FIG. 2) to a middle region of eighteen levels (FIG. 3). The second rearranged group consists of eleventh level 11 (indicated at "11, 1") and twelfth level 12 ("12, 1") placed outside of the sixteen levels of the first rearranged group. The eleventh and twelfth levels 11 and 12 of the second rearranged group are for the shifted output signal points (shown by black circles) and may therefore be called outside eleventh and outside twelfth levels. It is to be noted here that the first major converted signal 111 has the eleventh and the twelfth levels of the first rearranged group and the outside eleventh and the outside twelfth levels of the second rearranged group.

In order to distinguish the eleventh and the twelfth levels 11 and 12 of the first rearranged group from the outside eleventh and the outside twelfth levels 11 and 12, the code converting unit 10 produces the first minor converted signal 121. The first minor converted signal 121 has two levels in correspondence to the first and the second rearranged groups of the first major converted signal 111. The code converting unit 10 produces the first minor converted signal 121 having a zeroth level "0" (depicted as a second number of each set of the two numbers) when the first major converted signal 111 has one of the first through the fifteenth levels of the first rearranged group. The code converting unit 10 produces the first minor converted signal 121 having a second level "1" when the first major converted signal 111 has one of the outside eleventh and the outside twelfth levels 11 and 12.

Similarly, the second input digital signal 102 is rearranged in the second major converted signal 112 into two groups which will again be called first and second rearranged groups. The first rearranged group consists of zeroth through fifteenth levels 0 to 15 while the second rearranged group consists of outside eleventh and outside twelfth levels 11 and 12.

In FIG. 1, a first error correcting code producing circuit 21 is supplied with a first error correcting input signal 111-1 consisting of the first through an n-th bits of the first major converted signal 111 where n represents an integer which is not less than two and is not less than m. In the example being illustrated, the first error correcting input signal 111-1 consists of the first through the third bits among the first (least significant) through the fourth (most significant) bits of the first major converted signal 111. The first error correcting code producing circuit 21 produces a first double Lee-error correcting code sequence 131 as a first redundant information in the manner described in the Conference Record cited hereinabove. The first double Lee-error correcting code sequence 131 consists of three binary bits and is produced in the form of a sequence of time slots. It is to be noted here that the first error correcting input signal 111-1 does not include the most significant bit of the first major converted signal 111. It will be understood that the first major converted signal 111 represents one of zeroth through seventh levels when the most significant bit of the first major converted signal 111 has a logic zero value. In this event, it should be understood that the first error correcting code producing circuit 21 carries out error correcting calculation for the zeroth through the seventh levels 0 to 7 of the first major converted signal 111.

Similarly, the second error correcting code producing circuit 22 produces a second double Lee-error correcting code sequence 132 as a second redundant information in response to a second error correcting input signal 112-1 consisting of the first through the third bits of the second major converted signal 112. The second double Lee-error correcting code sequence 132 consists of three binary bits and is produced in the form of the same sequence of time slots of the first double Lee-error correcting code sequence 131. The second error correcting code producing circuit 22 carries out error correcting calculation for the zeroth through the seventh levels 0 to 7 of the second major converted signal 112 when the most significant bit of the second major converted signal 112 has the logic zero level. Under the circumstances, it should be understood that each of the first and the second error correcting code producing circuits 21 and 22 carries out the error correcting calculation by regarding the eighth through the fifteenth levels 8 to 15 as the zeroth through seventh levels 0 to 7 because each of the first and the second error correcting input signals 111-1 and 112-1 consists of three bits. Such an error correcting calculation has substantially no problem as described later. In FIG. 3, the distance between two adjacent output signal points is given by a unit distance and is equal to the unit distance described in conjunction with FIG. 2.

In the example being illustrated, the modulator uses a subdata signal in addition to the first and the second input digital signals 101 and 102. The subdata signal is a time sequence of binary bits and consists of a single bit per a single time slot of the first and the second double Lee-error correcting code sequences 131 and 132. By a subdata supplying circuit 30, the binary bits of the subdata signal are alternately supplied to the first multiplexer 31 as a first subdata signal 141 and to the second multiplexer 32 as a second subdata signal 142.

Supplied with the first major and the first minor converted signals 111 and 121, the first double Lee-error correcting code sequence 131, and the first subdata signal 141, the first multiplexer 31 forms at first a first four bit binary signal by adding the first subdata signal 141 to the first double Lee-error correcting code sequence 131 so that a single bit of the first subdata signal 141 becomes a most significant bit of the first four bit binary signal. On absence of the first subdata signal 141, the most significant bit of the first four bit binary signal is given by a logic zero value. The first multiplexer 31 next multiplexes the first four bit binary signal and the first major converted signal 111 into a first major multiplexed signal 151 in a time-division fashion. Simultaneously, the first multiplexer 31 time divisionally multiplexes the first minor converted signal 121 and a signal of zero value into a first minor multiplexed signal 161.

Similarly, the second multiplexer 32 is supplied with the second major and the second minor converted signals 112 and 122, the second double Lee-error correcting code sequence 132, and the second subdata signal 142. In a time-division fashion, the second multiplexer 32 multiplexes the second major converted signal 112, the second double Lee-error correcting code sequence 132, and the second subdata signal 142 into a second major multiplexed signal 152 and multiplexes the second minor converted signal 122, and a signal of zero value into a second minor multiplexed signal 162.

Responsive to the first major and the first minor multiplexed signals 151 and 161 and the second major and the second minor multiplexed signals 152 and 162, a modulating unit 40 amplitude modulates a pair of quadrature-phase carrier signals C1 into the multilevel quadrature amplitude modulated signal QAM. Since each of the first and the second error correcting code producing circuits 21 and 22 carries out the error correcting calculation for three binary bits and since the first and the second subdata signals are alternately supplied to the first and the second multiplexers 31 and 32, each of the output signal points of two hundred and sixty-four of the multilevel quadrature amplitude modulated signal QAM is never out of the approximately circular arrangement illustrated in FIG. 3. This means that the multilevel quadrature amplitude modulated signal QAM has a reduced peak amplitude which is lower than the peak amplitude described in conjunction with FIG. 2 even though the multilevel quadrature amplitude modulated signal QAM carries the first or the second double Lee-error correcting code sequence, namely, the first or the second redundant information. Furthermore, although the modulator is of the type which is for two hundred and sixty-four signal values, each of the first and the second error correcting code producing circuits 21 and 22 can be implemented by the type which is for the modulator for sixty-four signal values. This means that it is possible to render each of the first and the second error correcting code producing circuits compact. The multilevel quadrature amplitude modulated signal QAM is transmitted to a multilevel quadrature amplitude demodulator through a transmission path. It is readily understood that the first and the second error correcting code producing circuits 21 and 22 may produce a single Lee-error correcting code sequence. The subdata supplying circuit 30 may be of the type which is for supplying a subdata signal to only one of the first and the second multiplexers 31 and 32. If the subdata signal is supplied only to the first multiplexer 31, the subdata supplying circuit 30 serves as a first subdata supplying circuit. On the contrary, if the subdata signal is supplied to the second multiplexer 32 alone, the subdata supplying circuit 30 serves as a second subdata supplying circuit. Under the circumstances, when the subdata signal is supplied to both of the first and the second multiplexers 31 and 32, the subdata supplying circuit 30 may be called a third subdata supplying circuit.

Figure 4:
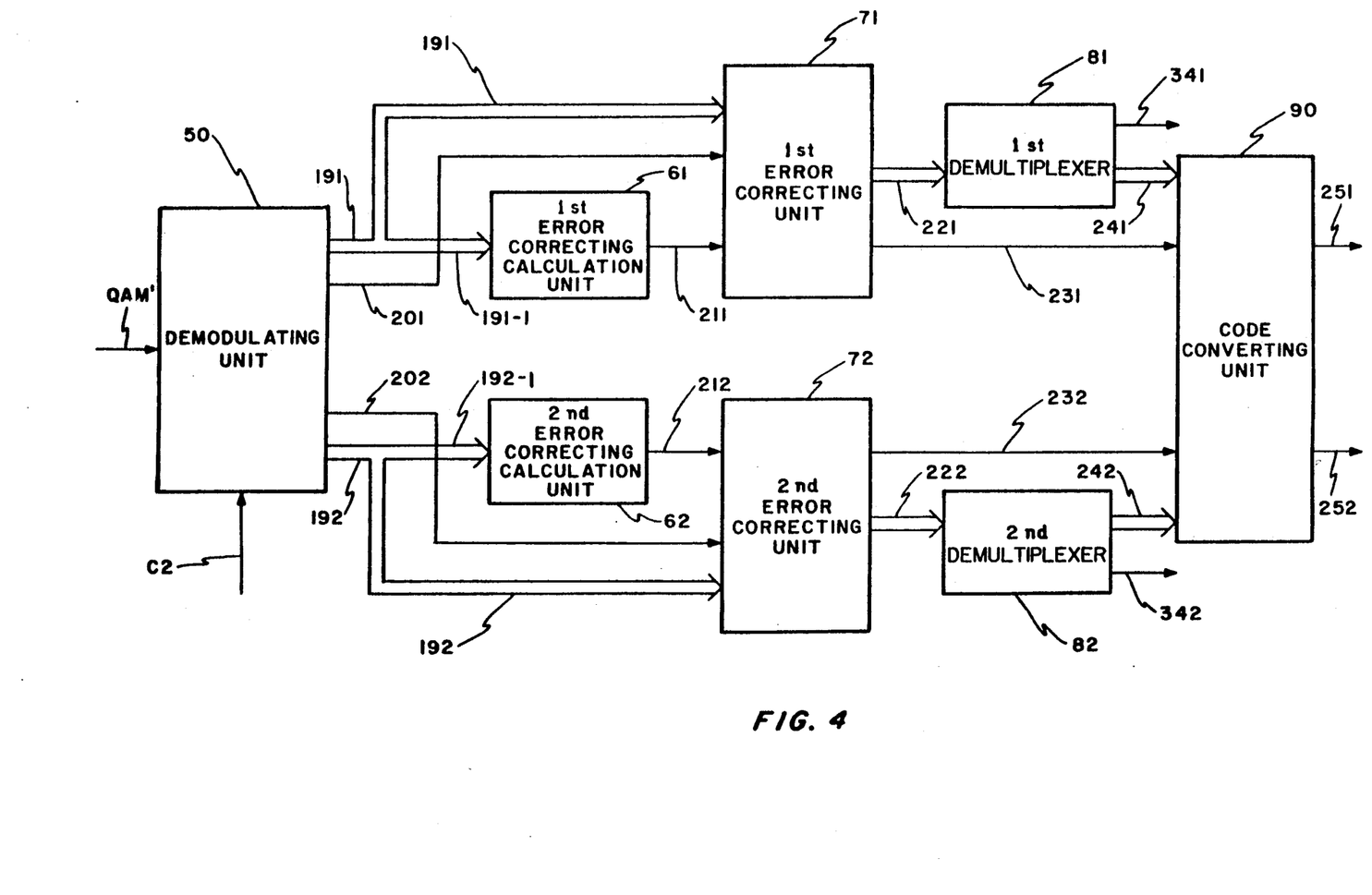
FIG. 4 is a block diagram of a multilevel quadrature amplitude demodulator for use as a counterpart of the multilevel quadrature amplitude modulator illustrated in FIG. 1.

Referring to FIG. 4, a multilevel quadrature amplitude demodulator is for use as a counterpart of the multilevel quadrature amplitude modulator illustrated with reference to FIG. 1. The demodulator is for demodulating the multilevel quadrature amplitude modulated signal illustrated with reference to FIG. 3.

The demodulator comprises a demodulating unit 50 supplied with the multilevel quadrature amplitude modulated signal indicated at QAM'. Responsive to a pair of quadrature-phase local carrier signals C2, the demodulating unit 50 demodulates the multilevel quadrature amplitude modulated signal QAM' into first major and first minor demodulated signals 191 and 201 of the channel P and second major and second minor demodulated signals 192 and 202 of the other channel Q. Each of the first and the second major demodulated signals 191 and 192 has four bits numbered from a first bit (a least significant bit) to a fourth bit (a most significant bit) and is capable of representing at most sixteen levels. Each of the first and the second minor demodulated signals 201 and 202 is a binary signal and is capable of representing two levels. If the multilevel quadrature amplitude modulated signal QAM is free from transmission error, the first major demodulated signal 191 and the first minor demodulated signal 201 are reproductions of the first major multiplexed signal 151 (FIG. 1) and the first minor multiplexed signal 161 (FIG. 1), respectively. By the same reason, the second major demodulated signal 192 and the second minor demodulated signal 202 are reproductions of the second major multiplexed signal 152 and the second minor multiplexed signal 162, respectively.

A first error correcting calculation circuit 61 is supplied with a first error correcting input signal 191-1 consisting of the first through the third bits among the first (least significant) through the fourth (most significant) bit of the first major demodulated signal 191. In the manner described in the above-referenced Conference Record, the first error correcting calculation circuit 61 deals with the first error correcting input signal 191-1 of eight levels (0 to 7) to detect the double Lee-error. The first error correcting calculation circuit 61 thereby produces a first error correcting signal 211 whenever the first error correcting calculation circuit 61 detects one or two double Lee-error of "+1" or "−1", or "+2" or "−2".

Similarly, a second error correcting calculation circuit 62 deals with a second error correcting input signal 192-1 consisting of the first through the third bits of the second major demodulated signal 192. The second error correcting calculation circuit 62 produces a second error correcting signal 212 on detection of the double Lee-error.

Supplied with the first major demodulated signal 191 and the first error correcting signal 211, a first error correcting circuit 71 corrects the double Lee-error of the first major and the first minor demodulated signals 191 and 201 with reference to the first error correcting signal 211 as will shortly be described more in detail. The first error correcting circuit 71 produces a first major correction result signal 221 and a first minor correction result signal 231. On the other hand, a second error correcting circuit 72 produces a second major correction result signal 222 and a second minor correction result signal 232. It will readily be understood that, if each of the first and the second major demodulated signals 191 and 192 is free from the code error, each of the first and the second error correcting circuits 71 and 72 produces the first and the second major demodulated signals 191 and 192 and the first and the second minor demodulated signals 201 and 202 as they stand.

Figure 5:
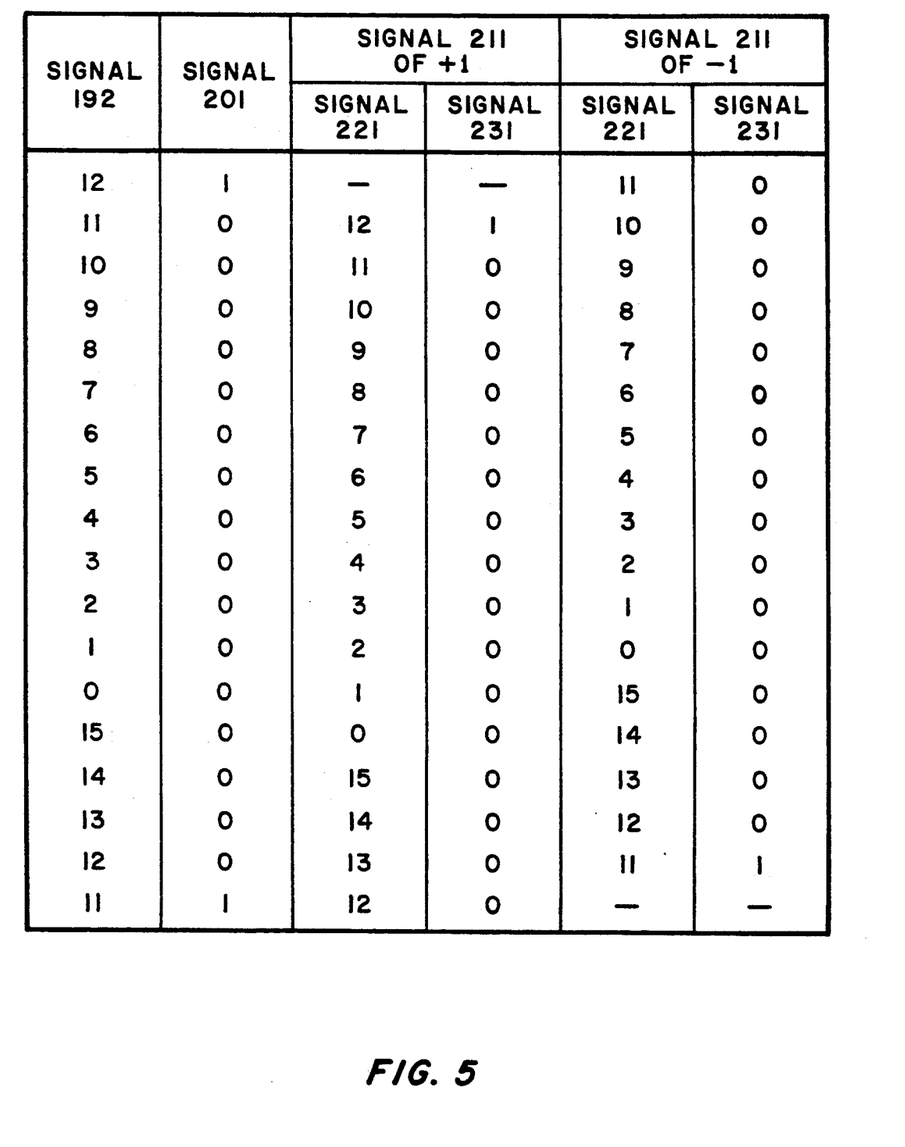
FIG. 5 is a diagram for use in describing an error correcting operation of an error correcting circuit of the quadrature amplitude demodulator illustrated in FIG. 4.

Referring to FIG. 5, the description will proceed to error correction in the first error correcting circuit 71. Although the error correction is described in connection with the first error correcting circuit 71, the description applies to the second error correcting circuit 72. The first major demodulated signal 191 has first and second rearranged groups. The first rearranged group consists of zeroth through fifteenth levels 0 to 15 depicted in the leftmost column except for the bottom "11" and the top "12". The second rearranged group consists of eleventh level 11 and twelfth levels 12 depicted in the leftmost column at the bottom and at the top. The eleventh and the twelfth levels of the second rearranged group may be called outside eleventh and outside twelfth levels, respectively. The first minor demodulated signal 201 has a level zero and a level one in correspondence to the first and the second rearranged groups of the first major demodulated signal 191 as shown in the second column from the left.

By way of example, attention will be directed to the seventh level 11 depicted at the second row from the top. When the first error correcting circuit 71 is supplied with the first error correctin signal 211 of "+1", the first error correcting circuit 71 converts the eleventh level 11 of the first major demodulated signal 191 to the twelfth level 12 which the first major correction result signal 221 has as depicted in the third column from the left at the second row from the top. Generally speaking, the first error correcting unit 71 produces the first major correction result signal 221 of a level which is equal to one plus the level of the first major demodulated signal 191 whenever the first error correcting circuit 71 is supplied with the first error correcting signal 211 of "+1". To the contrary, the first error correcting circuit 71 produces the first major correction result signal 221 with a level which is equal to the level of the first major demodulated signal 191 minus one whenever the first error correcting circuit 71 is supplied with the first error correcting signal 221 of "−1". In this manner, the first error correcting circuit 71 corrects the double Lee-error of "+1" or "−1" of the first major demodulated signal as shown in FIG. 5 in the manner which will be seen from the leftmost column and the third and the fifth columns from the left. With regard to the first minor demodulated signal 201, the first error correcting circuit 71 inverts the level of the first minor demodulated signal 201 on error correcting the eleventh level 11 and the outside eleventh level 11 of the first major demodulated signal 191 whenever the first error correcting circuit 71 is supplied with the first error correcting signal 211 of "+1". The first error correcting circuit 71 inverts the level of the first minor demodulated signal 201 on error correcting the outside twelfth level 12 and the twelfth level 12 of the first major demodulated signal 191 whenever the first error correcting circuit 71 is supplied with the first error correcting signal 211 of "−1".

Figure 6:
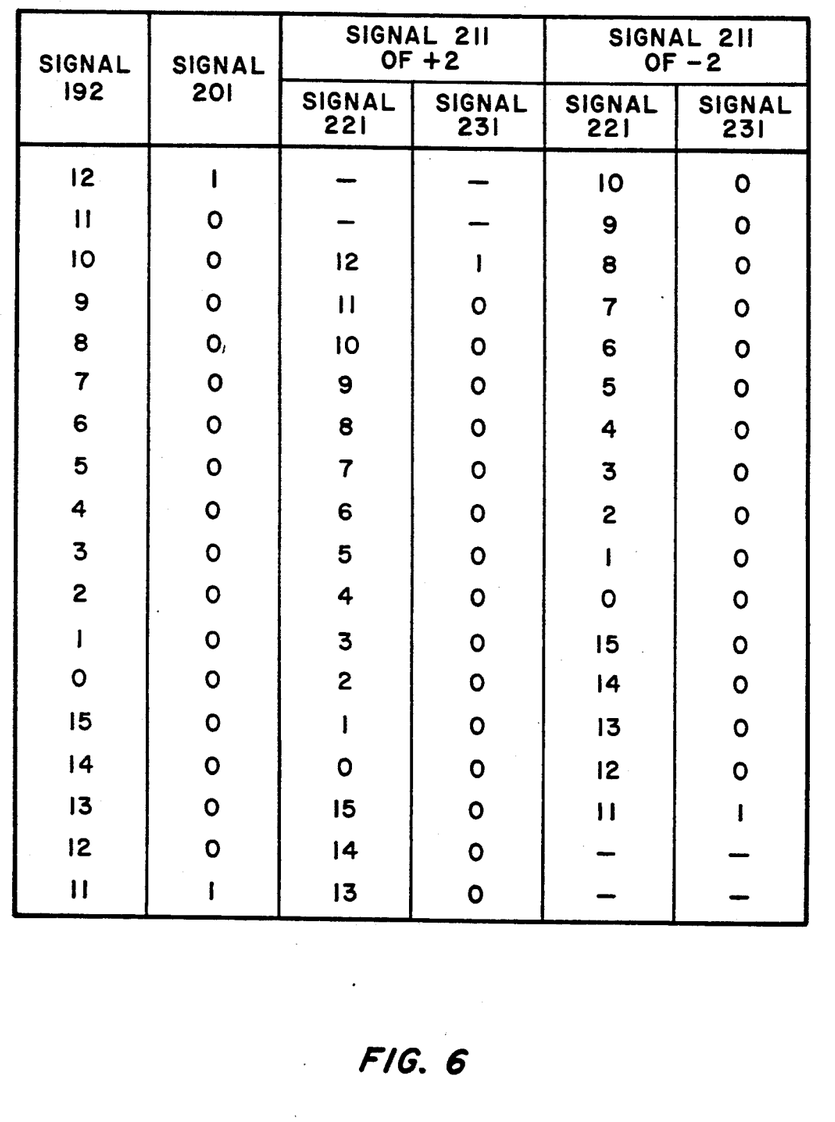
FIG. 6 is a diagram for use in describing another error correcting operation of the error correcting circuit of the quadrature amplitude demodulator illustrated in FIG. 4.

Referring afresh to FIG. 6 and again to FIG. 4, the first error correcting unit 71 produces the first major correction result signal 221 of a level which is equal to two plus the level of the first major demodulated signal 191 whenever the first error correcting circuit 71 is supplied with the first error correcting signal 211 of "+2". To the contrary, the first error correcting circuit 71 produces the first major correction result signal 221 of another level which is equal to the level of the first major demodulated signal 191 minus two whenever the first error correcting circuit 71 is supplied with the first error correcting signal 221 of "−2". In this manner, the first error correcting circuit 71 corrects the double Lee-error of "+2" or "−2" of the first major demodulated signal as shown in FIG. 6. With regard to the first minor demodulated signal 201, the first error correcting circuit 71 inverts the level of the first minor demodulated signal 201 on error correcting the tenth level 10 and the outside eleventh level 11 of the first major demodulated signal 191 and produces the first minor correction result signal 231 whenever the first error correcting circuit 71 is supplied with the first error correcting signal 211 of "−2".

By the way, the first error correcting code producing circuit 61 does not distinguish the zeroth through the seventh levels of the first major demodulated signal 191 from the eighth through the fifteenth levels thereof as described in conjunction with FIG. 3. This might bring about occurrence of any error such that the double Lee-error of "+1" or "−1" of the eighth through the fifteenth levels are regarded as the double Lee-error of "+1" or "−1" of the zeroth through the seventh levels, respectively, and that the double Lee-error of "+2" or "−2" of the eighth through the fifteenth levels are regarded as the double Lee-error of "+2" or "−2" of the zeroth through the seventh levels, respectively, despite the fact that the first major multiplexed signal 151 is correctly reproduced into the first major demodulated signal 191. But, such an error of the eighth through the fifteenth levels occur with a very low probability. The above-exemplified error can therefore be disregarded. Thus, although the demodulator is of the type which is for two hundred and sixty-four signal values, each of the first and the second error correcting code producing circuits 61 and 62 can be implemented by a circuit which is used in a demodulator for sixty-four signal values. This means that it is possible to render the first and the second error correcting code producing circuits compact.

In the example in which the first and the second subdata signals 141 and 142 are used in the counterpart modulator, the first and the second major correction result signals 221 and 222 comprise the first subdata signal 141 and the second subdata signal 142, respectively. The demodulator further comprises first and second demultiplexers 81 and 82. Supplied with the first major correcting result signal 221, the first demultiplexer 81 demultiplexes the first error correction result signal 221 into a first major demultiplexed signal 241 and a first demultiplexed subdata signal 341. The first major demultiplexed signal 241 is a reproduction of the first major modulated signal 111 (FIG. 1). The first demultiplexed subdata signal 341 is a reproduction of the first subdata signal 141. Similarly, the second demultiplexer 82 demultiplexes the second error correction result signal 222 into a second major demultiplexed signal 242 and a second demultiplexed subdata signal 342. The second major demultiplexed signal 242 is a reproduction of the second major modulated signal 112 while the second demultiplexed subdata signal is a reproduction of the second subdata signal 142.

A code converting unit 90 is supplied with the first and the second minor correction result signals 231 and 232 and the first and the second major demultiplexed signals 241 and 242. The code converting unit 90 carries out code conversion which is complementary to the code conversion of the code converting unit 10 (FIG. 1). The code converting unit 90 converts the first minor correction result signal 231 and the first major correction result signal 241 to produce a first output digital signal 251 representative of sixteen levels as a reproduction of the first input digital signal 101 (FIG. 1). The code converting unit 90 further converts the second minor correction result signal 232 and the second major correction result signal 242 to produce a second output digital signal 252 representative of sixteen levels as a reproduction of the second input digital signal 102.

According to this invention, the first and the second subdata signals can be transmitted by the use of the time slot for the first and the second error correcting code sequence without increasing the peak amplitude of the multilevel quadrature amplitude modulated signal. Needless to say, if either the first subdata signal 141 or the second subdata signal 142 is not supplied to the first multiplexer 31 or the second multiplexer 32, a corresponding one of the first demultiplexer 81 or the second demultiplexer 82 can be omitted. Furthermore, if the subdata supplying circuit 30 is omitted, both of the first and the second demultiplexers 81 and 82 can be omitted.

While this invention has thus far been described in conjunction with two preferred embodiments thereof, it will readily be possible for those skilled in the art to put this invention into practice in various other manners. For example, the number m may be three or five. When the number m is equal to three, the number n becomes equal to two. In this event, since each of the first and the second error correcting code sequences consists of two bits, it is possible to transmit two bits of the subdata signal per a single bit of each of the first and the second error correcting code sequences. Generally speaking, it is possible to transmit (m−n) bits of the subdata signal per a single bit of each of the first and the second error correcting code sequences. Each of the first and the second major converted signals may be rearranged into three or more groups. Each of the first and the second minor converted signals has three levels in correspondence to the respective groups when each of the first and the second major converted signals is rearranged into three groups. The first and the second error correcting code producing circuits may be implemented by another type, for example, which is for correcting a single Lee-error or the like.

What is claimed is:

1. A multilevel quadrature amplitude modulator for modulating first and second input digital signals into a multilevel quadrature amplitude modulated signal, each of said first and said second input digital signals being capable of representing at most N levels where N is equal to $2^m$ where, in turn, m represents an integer which is not less than three, said multilevel quadrature amplitude modulated signal being specified by a plurality of signal points on a phase plane, said modulator rearranging said signal points on said phase plane from a square arrangement into an approximately circular arrangement in which said signal points are arranged on an approximately circular region having a specific region inwardly of a circle, wherein the improvement comprises:

code converting means for converting said first input digital signal to first major and first minor converted signals and said second input digital signal to second major and second minor converted signals, each of said first and said second major converted signals having m bits numbered from a first bit to an m-th bit in bit parallel and having a first rearranged group of a first predetermined number of levels and a second rearranged group of a second predetermined number of levels, said first bit being a least significant bit of each of said first and said second major converted signals, each of said first and said second predetermined number of levels being related to one of said signal points at a time, said first minor converted signal having a third predetermined number of levels related to said first and said second rearranged groups, said second minor converted signal having a fourth predetermined number of levels related to said first and said second rearranged groups;

first error correcting code producing means for producing a first Lee-error correcting code sequence in response to a first error correcting input signal consisting of the first through an n-th bits of said first major converted signal where n represents an integer which is not less than two and is not less than m;

second error correcting code producing means for producing a second Lee-error correcting code sequence in response to a second error correcting input signal consisting of the first through the n-th bits of said second major converted signal;

first multiplexing means for multiplexing said first Lee-error correcting code sequence and said first major converted signal into a first major multiplexed signal and a signal of zero value and said first minor converted signal into a first minor multiplexed signal;

second multiplexing means for multiplexing said second Lee-error correcting code sequence and said second major converted signal into a second major multiplexed signal and a signal of zero value and said second minor converted signal into a second minor multiplexed signal; and modulating means for modulating said first major and said first minor multiplexed signals and said second major and said second minor multiplexed signals into said multilevel quadrature amplitude modulated signal.

2. A multilevel quadrature amplitude modulator as claimed in claim 1, wherein said modulator further comprises first supplying means for supplying a first subdata signal to said first multiplexing means, said first multiplexing means multiplexing said first bit through an (n−1)-th bit of said first Lee-error correcting code sequence, said first major converted signal, and said first subdata signal into a third major multiplexed signal for use as said first major multiplexed signal and said signal of zero value and said first minor converted signal into said first minor multiplexed signal.

3. A multilevel quadrature amplitude modulator as claimed in claim 1, wherein said modulator further comprises second supplying means for supplying a second subdata signal to said second multiplexing means, said second multiplexing means multiplexing said first bit through an (n−1)-th bit of said second Lee-error correcting code sequence, said second major converted signal, and said second subdata signal into a fourth major multiplexed signal for use as said second major multiplexed signal and said signal of zero value and said second minor converted signal into said second minor multiplexed signal.

4. A multilevel quadrature amplitude modulator as claimed in claim 1, wherein said modulator further comprises third supplying means for supplying a subdata signal to said first and said second multiplexing means, said subdata signal being a time sequence of binary bits, said third supplying means alternately supplying the binary bits of said subdata signal to said first multiplexing means as a first subdata signal and to said second multiplexing means as a second subdata signal, said first multiplexing means multiplexing said first bit through an (n−1)-th bit of said first Lee-error correcting code sequence, said first major converted signal, and said first subdata signal into a third major multiplexed signal for use as said first major multiplexed signal and multiplexing signal of zero value and said first minor converted signal into said first minor multiplexed signal; said second multiplexing means multiplexing said second Lee-error correcting code sequence, said second major converted signal, and said second subdata signal into a fourth major multiplexed signal for use as said second major multiplexed signal and multiplexing said signal of zero value second minor converted signal into said second minor multiplexed signal.

5. A multilevel quadrature amplitude demodulator for use as a counterpart of a modulator for converting a first input digital signal and a first Lee-error correcting code sequence into a first modulating signal and converting a second input digital signal and a second Lee-error correcting code sequence into a second modulating signal and for modulating said first and said second modulating signals into a multilevel quadrature amplitude modulated signal specified by a plurality of signal points on a phase plane, each of said first and said second input digital signals being capable of representing at most N levels where N is equal to $2^m$ where, in turn, m represents an integer which is not less than three, said modulator rearranging said signal points on said phase plane from a square arrangement into an approximately circular arrangement in which said signal points are arranged on an approximately circular region having a specific region inwardly of a circle, said demodulator being for demodulating said multilevel quadrature amplitude modulated signal into a first and a second output digital signal, wherein the improvement comprises:

demodulating means for amplitude demodulating said multilevel quadrature amplitude modulated signal into a first major and a first minor demodulated signal and a second major and a second minor demodulated signal, each of said first and said second major demodulated signals having m bits numbered from a first bit to an m-th bit in bit parallel and having a first rearranged group of a first predetermined number of levels and a second rearranged group of a second predetermined number of levels, said first bit being a least significant bit of each of said first and said second major demodulated signals, each of said first and said second predetermined number of levels being related to one of said signal points at a time, said first minor demodulated signal having a third predetermined number of levels related to said first and said second rearranged groups, said second minor demodulated signal having a fourth predetermined number of levels related to said first and said second rearranged groups;

first error correcting calculation means for producing a first error correcting signal in response to a first error correcting input signal consisting of the first through an n-th bits of said first major demodulated signal where n represents an integer which is not less than two and is not less than m;

second error correcting calculation means for producing a second error correcting signal in response to a second error correcting input signal consisting of the first through the n-th bits of said second major demodulated signal;

first error correcting means for correcting said first major and said first minor demodulated signals with reference to said first error correcting signal to produce a first major correcting result signal as a reproduction of said first modulating signal and a first minor correcting result signal, respectively;

second error correcting means for correcting said second major and said second minor demodulated signals with reference to said second error correcting signal to produce a second major correcting result signal as a reproduction of said second modulating signal and second minor correcting result signal, respectively; and code converting means for converting said first major and said first minor correcting result signals and said second major and said second minor correcting result signals into said first and said second output digital signals as reproductions of said first and said second input digital signals.

6. A multilevel quadrature amplitude demodulator as claimed in claim 5, said first modulating signal further comprising a first subdata signal, wherein said demodulator further comprises first separating means responsive to said first major correcting result signal for separating said first subdata signal from said first major correcting result signal.

7. A multilevel quadrature amplitude demodulator as claimed in claim 5, said second modulating signal further comprising a second subdata signal, wherein said demodulator further comprises second separating means responsive to said second major correcting result signal for separating said second subdata signal from said second major correcting result signal.

8. A multilevel quadrature amplitude demodulator as claimed in claim 5, said first and said second modulating signals further comprising a first and a second subdata signal, respectively, wherein said demodulator further comprises first separating means responsive to said first major correcting result signal for separating said first subdata signal from said first major correcting result signal and second separating means responsive to said second major correcting result signal for separating said second subdata signal from said second major correcting result signal.

* * * * *